US009047063B2

(12) United States Patent
Chang et al.

(10) Patent No.: US 9,047,063 B2
(45) Date of Patent: Jun. 2, 2015

(54) MOUNTING ASSEMBLY FOR DATA STORAGE DEVICES

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Hung-Chieh Chang, New Taipei (TW); Li-Ping Chen, New Taipei (TW); Tang-Qing Hu, Shenzhen (CN); Sheng-Ping Xie, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 235 days.

(21) Appl. No.: 13/859,500

(22) Filed: Apr. 9, 2013

(65) Prior Publication Data

US 2014/0016263 A1    Jan. 16, 2014

(30) Foreign Application Priority Data

Jul. 12, 2012    (CN) .......................... 2012 1 0240386

(51) Int. Cl.
*H05K 5/00*    (2006.01)
*G06F 1/18*    (2006.01)

(52) U.S. Cl.
CPC ...................................... *G06F 1/187* (2013.01)

(58) Field of Classification Search
CPC ......................................................... G06F 1/187
USPC ....................... 361/679.31–679.39, 728–735
See application file for complete search history.

(56) References Cited

U.S. PATENT DOCUMENTS 8,582,287 B2 * 11/2013 Nguyen et al. ........... 361/679.37

* cited by examiner

*Primary Examiner* — Ramon Barrera
(74) *Attorney, Agent, or Firm* — Novak Druce Connolly Bove + Quigg LLP

(57) ABSTRACT

A mounting assembly includes a chassis, and a plurality of partition panels configured to divide a space in the chassis into a plurality of sub-spaces. A motherboard is attached to the chassis and located below the plurality of partition panels. A plurality of data storage devices is mounted in each of the plurality of sub-spaces. Each of the plurality of data storage devices comprising a casing, at least one drive bracket mounted in the casing, at least one data storage unit mounted in the at least one drive bracket, and a handle pivotably attached to the at least one drive bracket. The handle is rotatable between a locked position, where the at least one drive bracket is immovable from the casing, and a released position, where the at least one drive bracket is released from the casing.

20 Claims, 4 Drawing Sheets

MOUNTING ASSEMBLY FOR DATA STORAGE DEVICES

BACKGROUND

1. Technical Field

The present disclosure relates to a mounting assembly for data storage devices.

2. Description of Related Art

Various data storage devices are installed in computers for communication and handling of data. Such devices include, for example, hard disk drives, floppy disk drives, and CD-ROM drives. A conventional data storage device is attached to a computer enclosure with bolts. However, attachment with bolts is unduly complicated and time-consuming.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
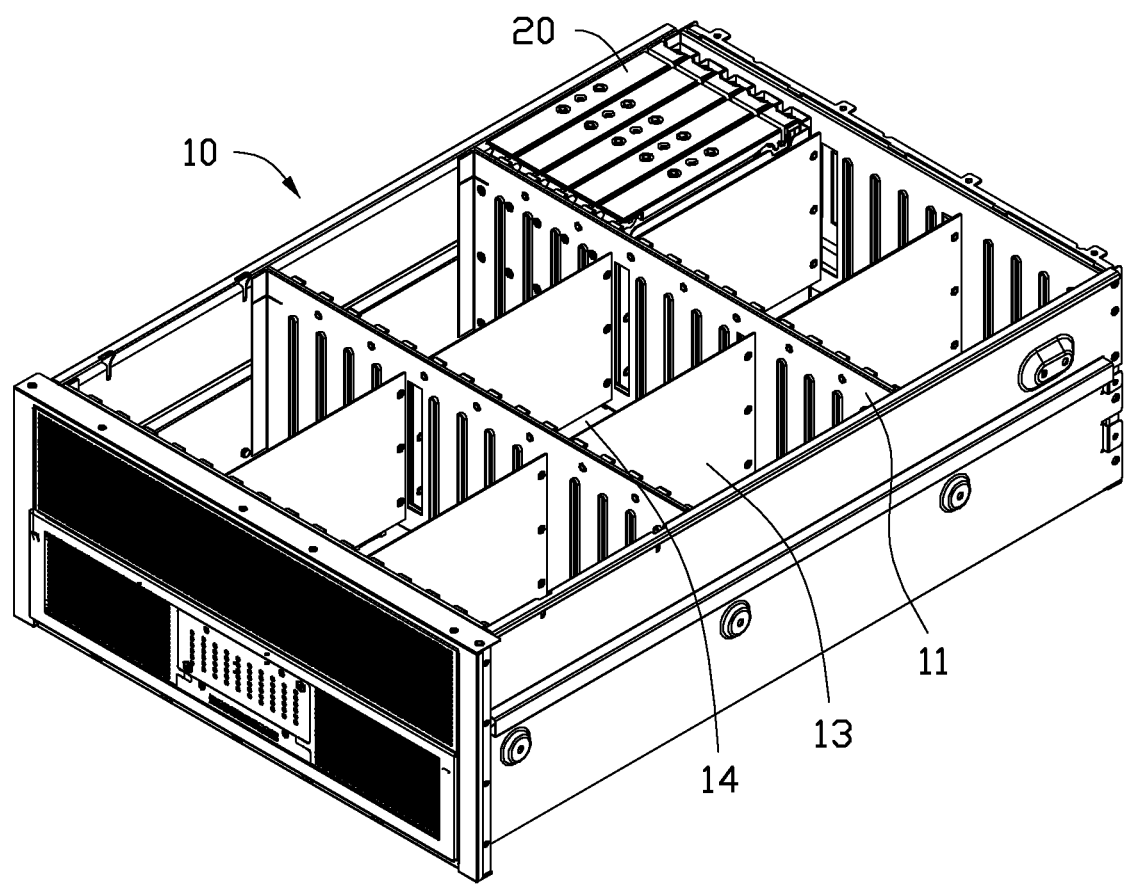
FIG. 1 is an assembled view of a mounting assembly for data storage devices in accordance with an embodiment.

FIG. 1 shows an exemplary embodiment of an electronic device. The electronic device includes a chassis 10 and a plurality of data storage devices 20 mounted in the chassis 10.

A plurality of partition panels 11 is mounted in the chassis 10 and divides an accommodating space in the chassis 10 into a plurality of sub-spaces 13. Each of the plurality of sub-spaces 13 can accommodate a plurality of data storage devices 20. A motherboard 14 is mounted on a bottom plate of the chassis 10 and located below the plurality of partition panels 11. Each of the plurality of partition panels 11 is substantially perpendicular to the motherboard 14.

Figure 2:
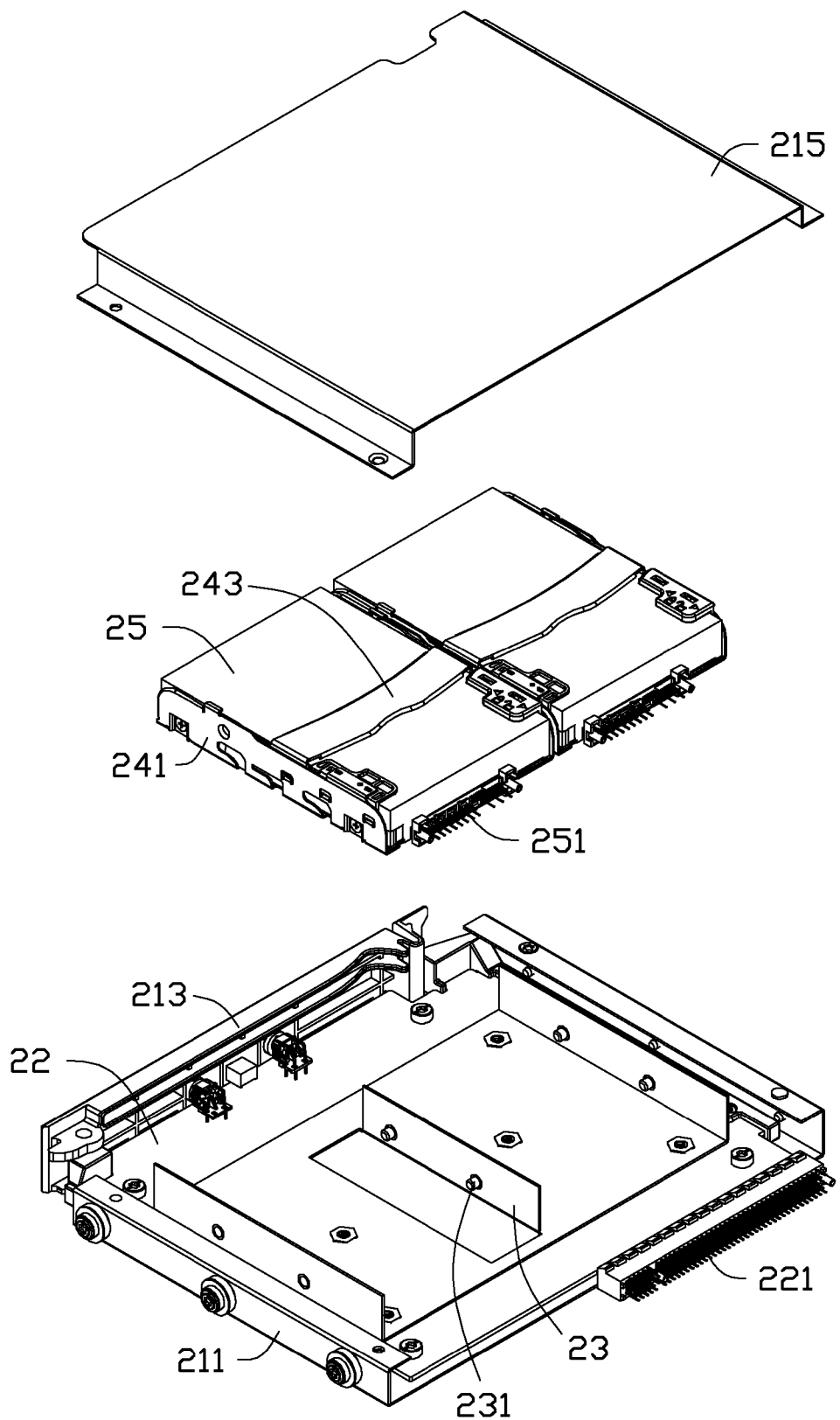
FIG. 2 is an exploded view of one of the data storage devices of FIG. 1.
Figure 3:
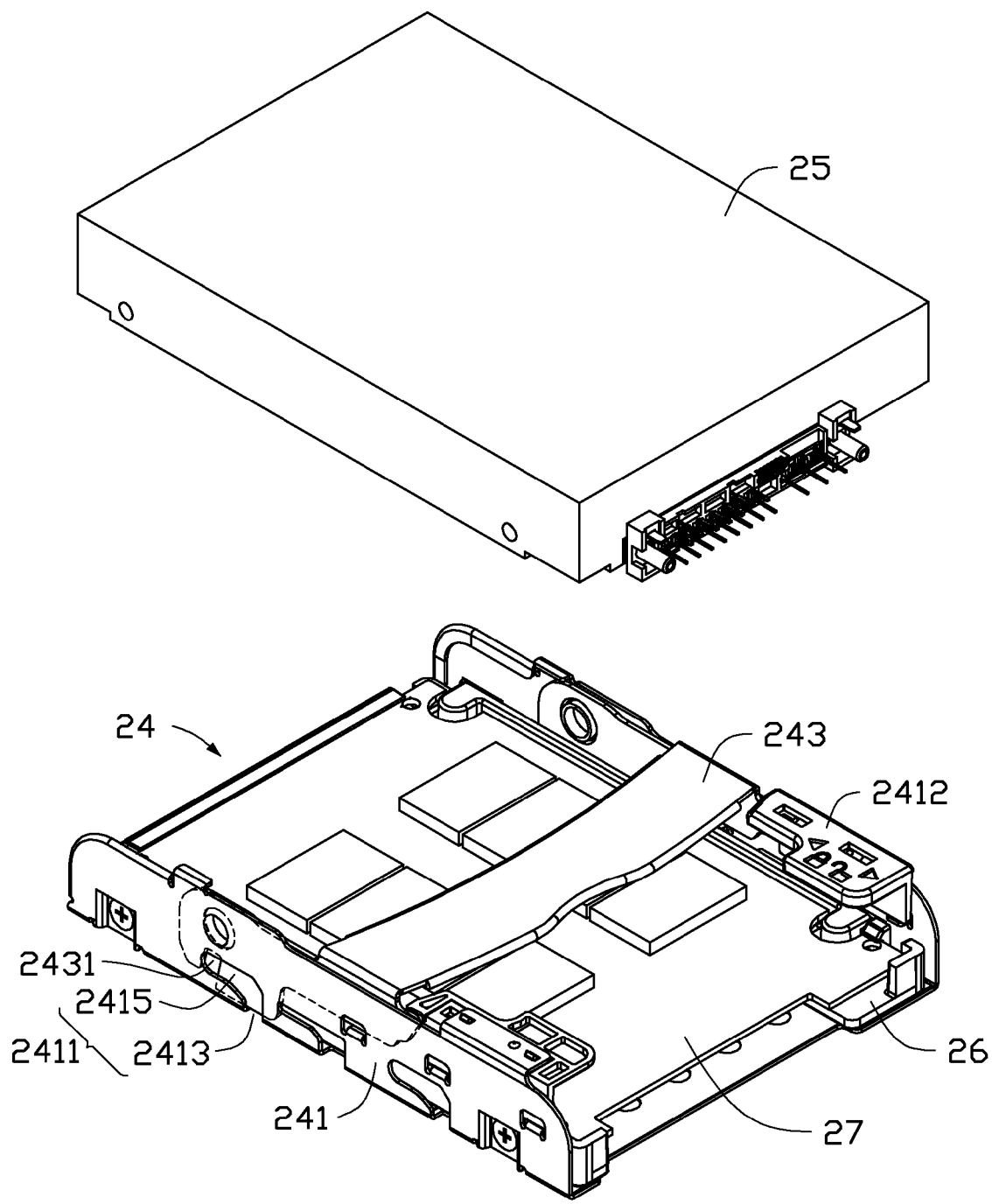
FIG. 3 is an exploded view of a data storage unit and a drive bracket of FIG. 2.
Figure 4:
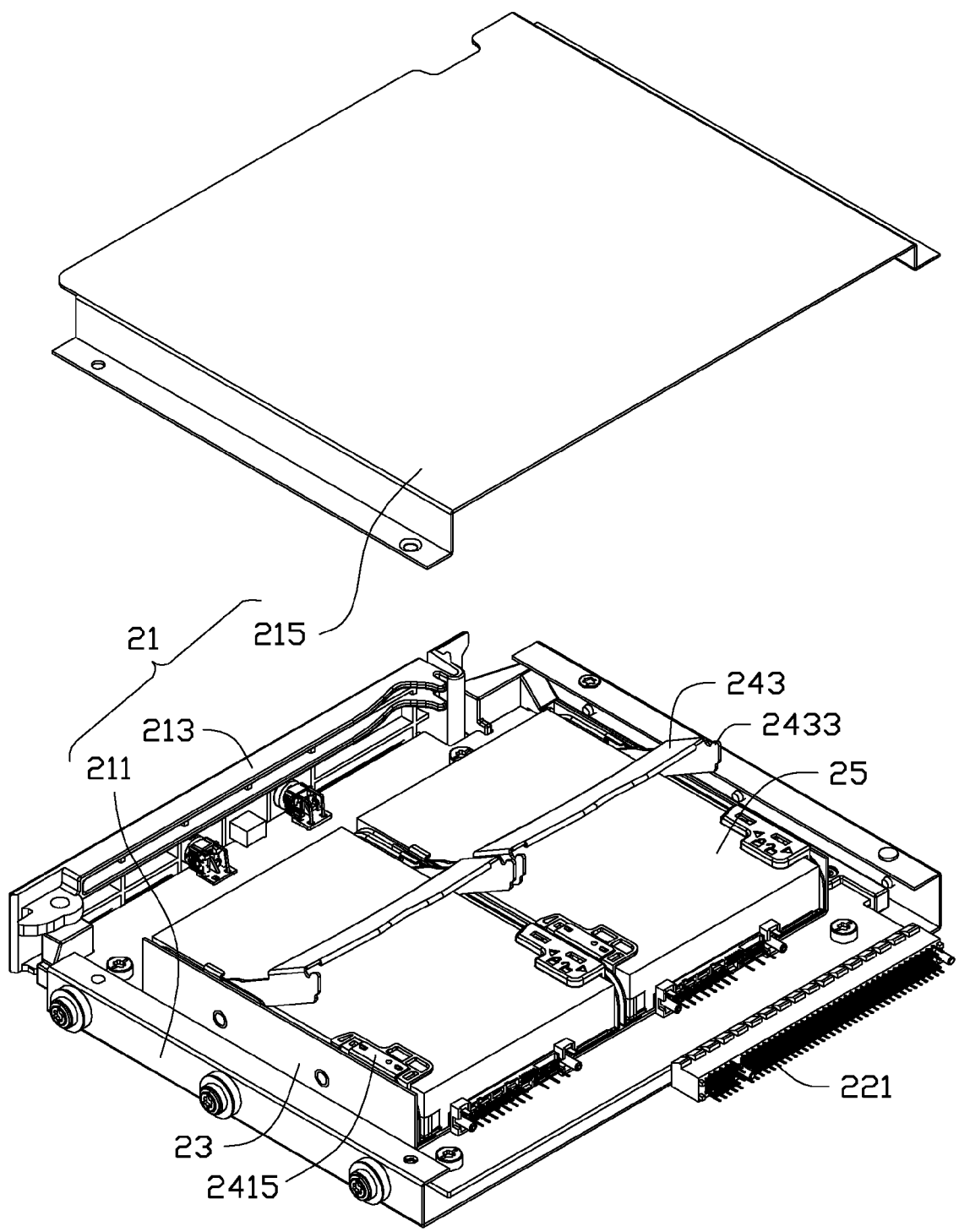
FIG. 4 is a partially assembled view of one of the data storage devices of FIG. 2.

FIGS. 2 to 4 show that each of the plurality of data storage devices 20 includes a casing 21, a first circuit board 22, three mounting plates 23 perpendicularly attached on the first circuit board 22, a pair of drive brackets 24, and a pair of data storage units 25 mounted in the pair of drive brackets 24. Each of the pair of drive brackets 24 is mounted between each two adjacent ones of the three mounting plates 23. The casing 21 includes a main body 211, a securing member 213 attached to a first side of the main body 211, and a covering plate 215 adapted to cover the main body 211. The securing member 213 can be latched to each of the plurality of partition panels 11. A connector 221 is electrically connected to the first circuit board 22 and located at a second side of the main body 211. A pair of protruding posts 231 protrudes from each of the three mounting plates 23.

FIG. 3 shows that each of the pair of drive brackets 24 includes a pair of side plates 241 and a handle 243 pivotally attached to the pair of side plates 241. A pair of slots 2411 is defined in each of the pair of side plates 241. Each of the pair of slots 2411 includes an entrance portion 2413 and a holding portion 2415 connecting with the entrance portion 2413. The handle 243 is formed in a roughly U-shape. Each of the pair of slots 2411 is substantially an L shape. A blocking member 2412 is slidably attached to each of the pair of side plates 241. A pair of notches 2431 is defined in the handle 243 and located adjacent to opposite ends of the handle 243. The handle 243 includes a pair of engaging portions 2433 located at opposite shoulders of the handle 243 for engaging with the blocking member 2412. A supporting member 26 is attached on a base plate of the drive bracket 24. A second circuit board 27 is attached on the supporting member 26. Each of the pair of data storage units 25 is adapted to be mounted on the second circuit board 27 and electrically connected to the second circuit board 27.

To mount each of the pair of data storage units 25 in the casing 21, the blocking member 2412 is moved away from the handle 243 to disengage from the engaging portion 2433. The handle 243 is rotated to a released position (see FIG. 4), where the handle 243 is oblique relative to the second circuit board 27. Each of the pair of data storage units 25 is mounted on the second circuit board 27. Each of the pair of drive brackets 24 is mounted between two adjacent ones of the three mounting plates 23. Each of the pair of protruding posts 231 enters the entrance portion 2413. Each of the pair of protruding posts 231 is engaged with the notch 2431. The handle 243 is rotated downward to a locked position, where the handle 243 abuts a top surface of each of the pair of data storage units 25. Each of the pair of protruding posts 231 slides in the holding portion 2415 by push of the handle 243. The blocking member 2412 is moved towards the handle 243 to engage with each of the pair of engaging portions 2433. The handle 243 is secured at the locked position by the blocking member 2412. The pair of drive brackets 24 and the pair of data storage units 25 are secured in the casing 21. The covering plate 215 is attached to the main body 211 and covers the pair of data storage units 25. The casing 21 together with the pair of data storage units 25 is moved into one of the plurality of sub-spaces 13 along a direction perpendicular to the motherboard 14. The connector 221 is plugged to a corresponding connector on the motherboard 14.

To detach each of the pair of drive brackets 24 from the casing 21, the covering plate 215 is detached from the main body 211. The handle 243 is rotated upwardly to the released position. The handle 243 pushes each of the pair of protruding posts 231 sliding from the holding portion 2415 to the entrance portion 2413. Each of the pair of drive brackets 24 is moved upwardly and detached from the main body 211.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting assembly comprising:
a chassis defining a space;
a plurality of partition panels mounted in the chassis for dividing the space into a plurality of sub-spaces;
a motherboard attached to the chassis below the plurality of partition panels;
a plurality of data storage devices received in each of the plurality of sub-spaces, each of the plurality of data storage devices comprising a casing, at least one drive bracket mounted in the casing, at least one data storage unit mounted in the at least one drive bracket, and a handle pivotably attached to the at least one drive bracket;
wherein the handle is rotatable between a locked position, where the at least one drive bracket is immovable from the casing; and a released position, where the at least one drive bracket is releasable from the casing.

2. The mounting assembly of claim 1, wherein the casing comprises a main body and at least one mounting plate mounted in the main body, at least one protruding post protrudes from the at least one mounting plate, and at least one slot is defined in the at least one drive bracket for engaging with the at least one protruding post.

3. The mounting assembly of claim 2, wherein the at least one slot includes an entrance portion and a holding portion connected to the entrance portion, the at least one protruding post is engaged with the holding portion when the handle is in the locked position, and the at least one protruding post is engaged with the entrance portion when the handle is in the released position.

4. The mounting assembly of claim 3, wherein a notch is defined in the handle, and the at least one protruding post is engaged with the notch.

5. The mounting assembly of claim 4, wherein the handle comprises at least one engaging portion, and a blocking member is slidably attached to the main body for engaging with the at least one engaging portion.

6. The mounting assembly of claim 5, wherein the blocking member is movable between a first position, where the blocking member abuts the at least one engaging portion for preventing rotation of the handle; and a second position, where the blocking member is disengaged from the at least one engaging portion for releasing the handle.

7. The mounting assembly of claim 6, wherein the handle is formed in a roughly U-shape, and the at least one slot roughly has an L shape.

8. The mounting assembly of claim 7, wherein the notch is located adjacent to an end of the handle, and the at least one engaging portion is located at a shoulder of the handle.

9. The mounting assembly of claim 1, wherein the plurality of partition panels are substantially perpendicularly to the motherboard.

10. The mounting assembly of claim 9, wherein each of the plurality of data storage devices comprises a connector plugged to the motherboard.

11. A mounting assembly comprising:
a chassis;
a plurality of partition panels configured to divide a space in the chassis into a plurality of sub-spaces;
a motherboard attached to the chassis and substantially perpendicular to the plurality of partition panels;
a plurality of data storage devices received in each of the plurality of sub-spaces, each of the plurality of data storage devices comprising a casing secured to one of the plurality of partition panels, at least one drive bracket mounted in the casing, at least one data storage unit mounted in the at least one drive bracket, and a handle pivotably attached to the at least one drive bracket;
wherein the handle is rotatable between a locked position, where the at least one drive bracket is immovable from the casing; and a released position, where the at least one drive bracket is released from the casing.

12. The mounting assembly of claim 11, wherein the casing comprises a main body and at least one mounting plate mounted in the main body, at least one protruding post protrudes from the at least one mounting plate, and at least one slot is defined in the at least one drive bracket for engaging with the at least one protruding post.

13. The mounting assembly of claim 12, wherein the at least one slot includes an entrance portion and a holding portion connected to the entrance portion, the at least one protruding post is engaged with the holding portion when the handle is in the locked position, and the at least one protruding post is engaged with the entrance portion when the handle is in the released position.

14. The mounting assembly of claim 13, wherein a notch is defined in the handle, and the at least one protruding post is engaged with the notch.

15. The mounting assembly of claim 14, wherein the handle comprises at least one engaging portion, and a blocking member is slidably attached to the main body for engaging with the at least one engaging portion.

16. The mounting assembly of claim 15, wherein the blocking member is movable between a first position, where the blocking member abuts the at least one engaging portion for preventing rotation of the handle; and a second position, where the blocking member is disengaged from the at least one engaging portion for releasing the handle.

17. The mounting assembly of claim 16, wherein the handle is formed in a roughly U-shape, and the at least one slot roughly has an L shape.

18. The mounting assembly of claim 17, wherein the notch is located adjacent to an end of the handle, and the at least one engaging portion is located at a shoulder of the handle.

19. The mounting assembly of claim 11, wherein the at least one drive bracket comprises a pair of side plates attached to the casing, and the handle is pivotably attached to the pair of side plates.

20. The mounting assembly of claim 11, wherein the handle abuts the at least one data storage unit at the locked position, and the handle is oblique relative to the at least one data storage unit at the released position.

* * * * *